Dec. 14, 1965   B. FORD ETAL   3,222,727
MOLDING APPARATUS
Filed April 2, 1963   4 Sheets-Sheet 1
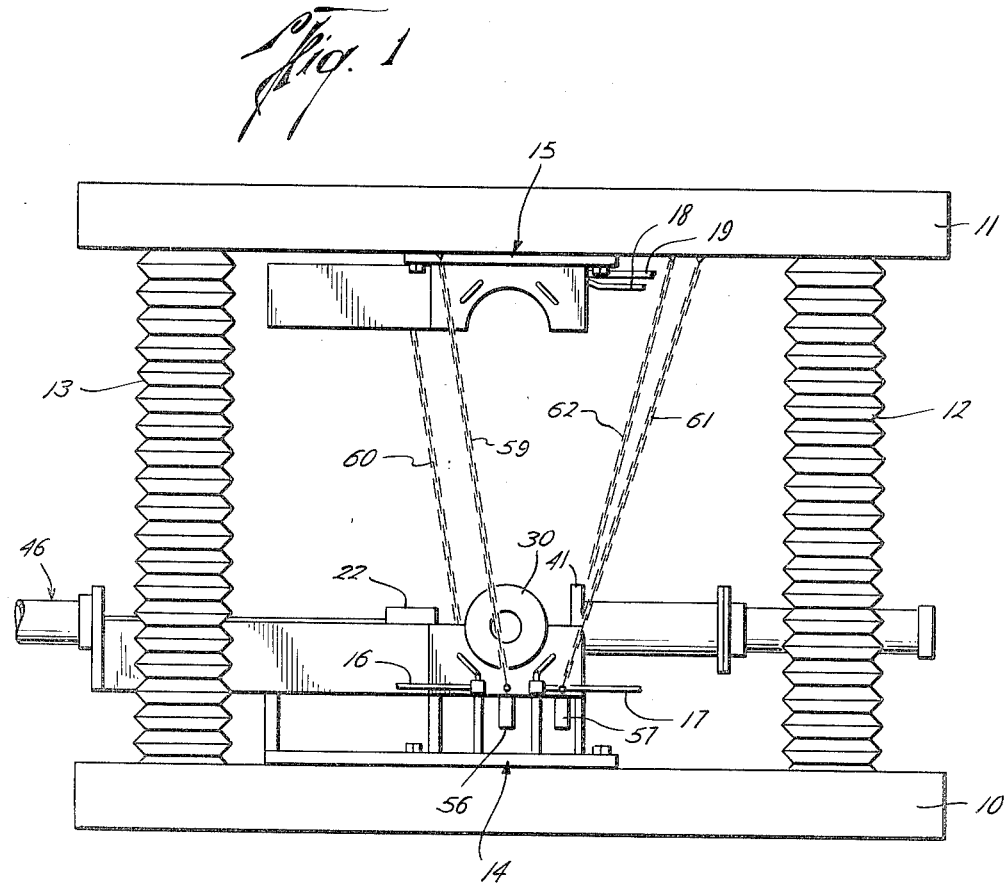
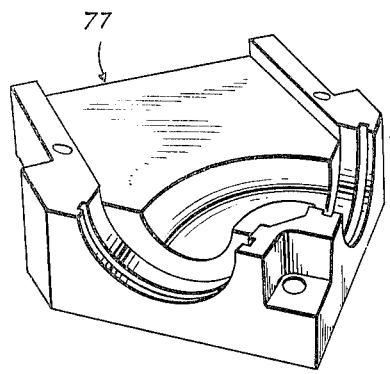
Bruce Ford
George E. Wells
INVENTORS Dec. 14, 1965 B. FORD ETAL 3,222,727
MOLDING APPARATUS
Filed April 2, 1963 4 Sheets-Sheet 2

Bruce Ford
George E. Wells
INVENTORS
BY J. Vincent Martin
Joe E. Edwards
M. H. Gay
ATTORNEYS

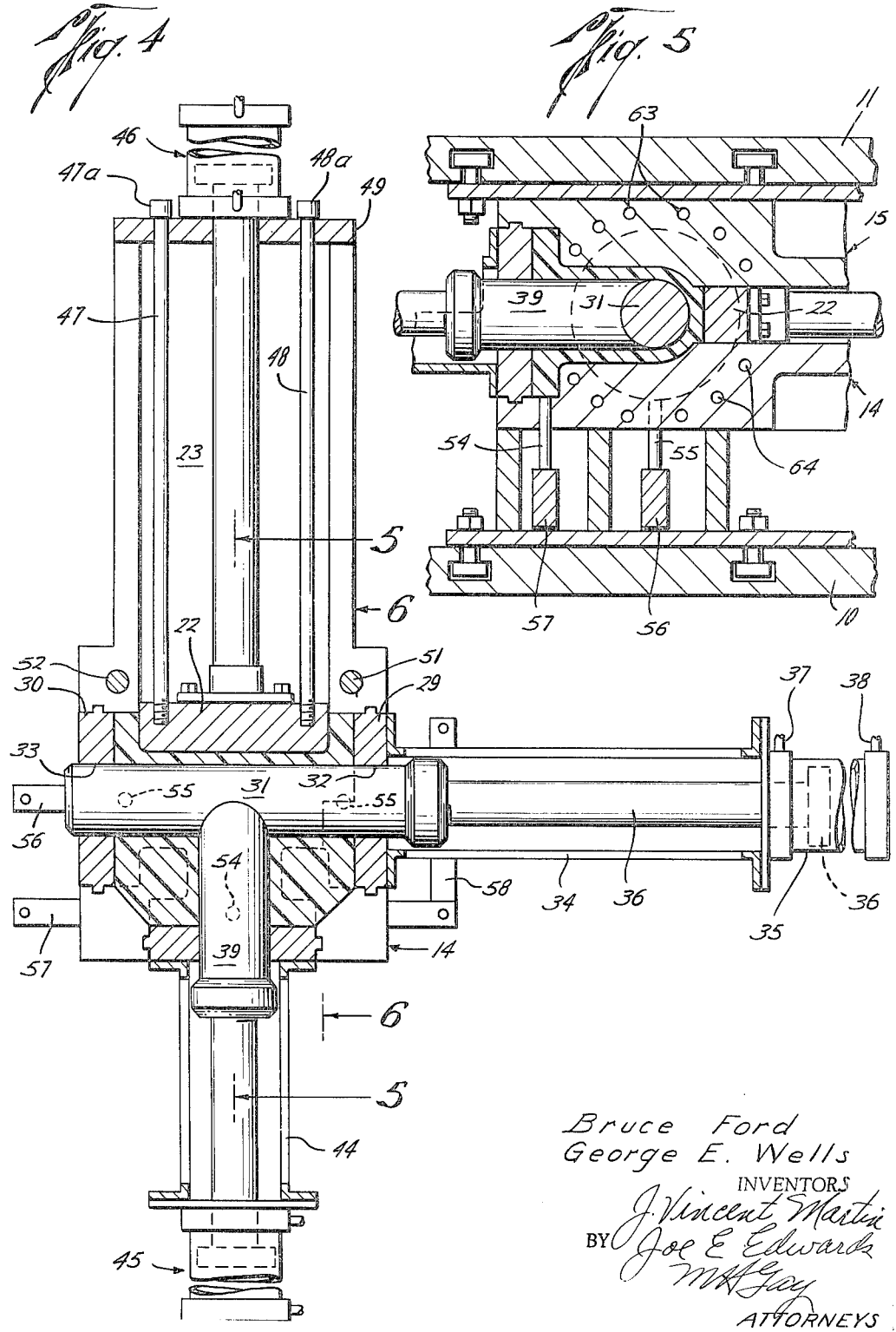

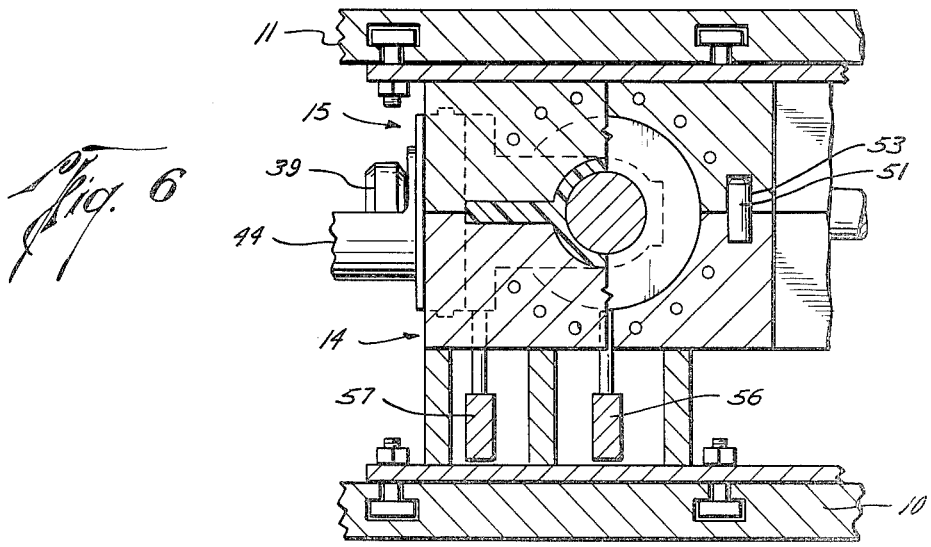
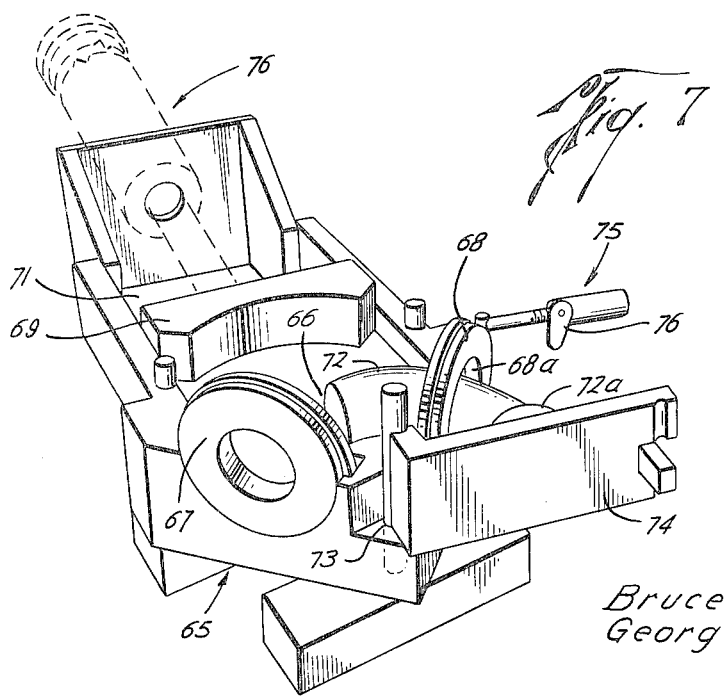

United States Patent Office 3,222,727
Patented Dec. 14, 1965

3,222,727
MOLDING APPARATUS
Bruce Ford and George E. Wells, Sand Springs, Okla., assignors to The Youngstown Sheet and Tube Company, Boardman, Ohio, a corporation of Ohio
Filed Apr. 2, 1963, Ser. No. 269,997
8 Claims. (Cl. 18—30)

This invention relates to molding apparatus, and more particularly to apparatus for molding fittings from dry plastic materials.

Reinforced plastic pipe fittings are in general use today in many services. In the past it has been customary to mold these fittings in half segments, that is, in molding apparatus which would mold one-half of the fitting. The two halves were then glued together with a suitable adhesive.

This work has been difficult and time consuming in that a multi-mold process is involved, and in that the molds used in the past have not been provided with means for releasing the fitting from the mold.

In past practice, angle fittings, such as a 90° bend or a 45° bend, have been provided using two straight cores which met in the middle of the fitting. Thus, a fairly sharp angle is present in the fitting which is not as satisfactory as a bore of constant radius.

Molds for molding one-piece plastic fittings are known, but these molds require that liquid plastic be used to charge the molds. This prohibited the possibility of using reinforcing material in the plastic, such as fiberglass, and therefore the more difficult processes above outlined were followed to permit the manufacture of fittings having reinforcing material in the plastic to give them greater strength.

It is an object of this invention to provide apparatus for molding a complete one-piece fitting using dry plastic ingredients.

Another object is to provide apparatus for molding complete one-piece angle fittings having a constant radius bore therethrough using dry ingredients.

Another object is to provide apparatus of the type specified in the preceding objects in which means for releasing the fitting from the mold is provided.

Other objects, features and advantages of this invention will be apparent from the specification, the drawings and the claims.

In the drawings, wherein illustrative embodiments of this invention are shown, and wherein like reference numerals indicate like parts:

FIGURE 1 is an elevational view of an apparatus constructed in accordance with this invention;

FIGURE 4 is a top view of the lower mold half shown partially in elevation and partially in section;

FIGURE 5 is a view along the line 5—5 of FIGURE 4;

FIGURE 6 is a view along the line 6—6 of FIGURE 4;

FIGURE 7 is an isometric view of the lower mold and associated apparatus of a modified form of this invention for forming a 90° fitting; and FIGURE 8 is an isometric worm's-eye view of the top mold section which cooperates with the lower mold section shown in FIGURE 7 in forming the 90° fitting.

Referring first to FIGURE 1, the molding apparatus for molding fittings includes a press which may take any conventional form for holding the mold sections together against the internal pressure developed in the mold cavity. The press illustrated has a lower fixed platform 10 and an upper movable carrier 11. The movable carrier may be raised and lowered by pistons arranged at the corners of the movable carrier. Two of these pistons covered by suitable accordion-like dust covers are shown at 12 and 13.

Figure 3:
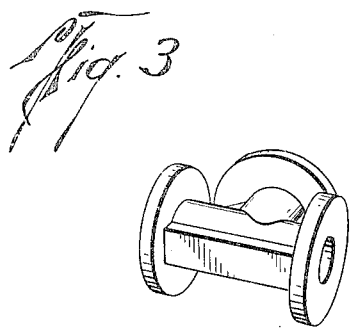
FIGURE 3 is an isometric view of a T fitting produced in the apparatus shown in FIGURES 1 and 2.

The fixed platform 10 supports a first or lower mold half indicated generally at 14. The movable carrier 11 supports an upper or second mold half indicated generally at 15. The two mold halves are mounted in the press to cooperate with each other when the mold is closed to form the T fitting shown in FIGURE 3. In forming the fitting, the mold cavity is filled under a substantial pressure on the order of many hundreds of pounds by a ram to be hereinafter described. During the molding process, heat is supplied to the mold halves such as by steam lines 16 and 17 associated with the lower mold half, and steam lines 18 and 19 associated with the upper mold half. Molding under pressure permits a much denser fitting to give higher strength. The heat supplied through the steam lines provides the elevated temperature for curing the resin from which the fitting is formed.

Reference is now made to FIGURES 2, 4, 5 and 6. The lower mold half 14 has formed in its upper surface a cavity 21 which will form approximately one-half of the fitting shown in FIGURE 3. The contour of the cavity conforms to the desired external configuration of the fitting to be made. In like manner, the upper mold half 15 has formed therein a cavity which complements cavity 21 and is contoured to form the desired outer configuration of the fitting. While the upper and lower mold sections are referred to herein in the conventional manner as upper and lower halves, it is apparent that they are not true complete mold halves as the mold cavity is completed by the ram 22 and the lower mold half has surfaces thereon which obviously form more than one-half of the mold cavity.

Figure 2:
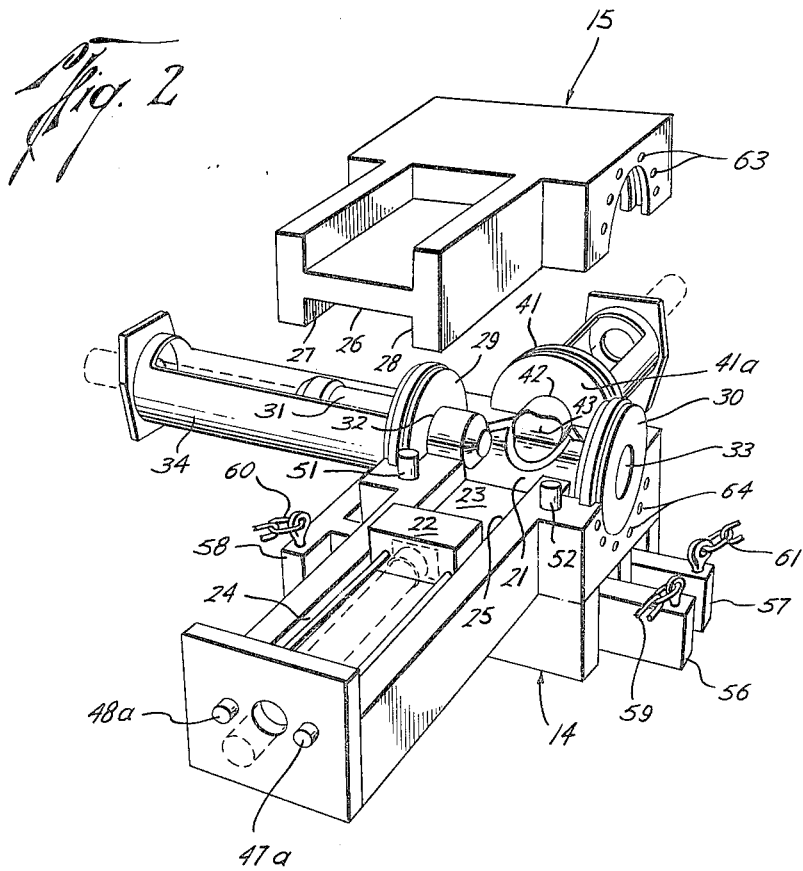
FIGURE 2 is an exploded isometric view of the molds and associated apparatus of FIGURE 1.

The lower mold half 14 is provided with a way in which the ram 22 reciprocates. The way includes a bed 23, and side walls 24 and 25. The upper mold half 15 is provided with a downwardly facing surface which cooperates with the way and the ram to confine material on the way. As shown in FIGURE 2, the confining surface on the upper mold includes a downwardly facing surface 26 which overlies ram 22 and a pair of confronting surfaces 27 and 28 which extend downwardly from surface 26. The surfaces 27 and 28 form a continuation of surfaces 24 and 25 on the lower ram so that these surfaces 23 through 28 form a rectangular cavity in which ram 22 reciprocates.

Core means are provided which are extensible through the cavities provided in the upper and lower mold halves to provide a core in the mold which will result in a passageway through a fitting formed in the mold. In the T fitting arrangement shown in FIGURE 2, a pair of opposed bosses 29 and 30 are provided in the lower mold half and confronting surfaces form a portion of the mold cavity. A core member 31 is reciprocal through the bore 32 in boss 29 and the bore 33 in boss 30. As shown, the core member 31 is of a sufficient length to extend completely through the cavity with the nose of the core member 31 inserted into the bore 33 in boss 30. This core provides the cross arm passageway of the T fitting.

The core member 31 may be reciprocated by any desired means. In the preferred form, core 31 reciprocates in a guide 34 attached to boss 29. Suitable pneumatic actuator including a cylinder 35 and a piston 36 reciprocal therein, in response to flow of pressure through conduits 37 and 38, reciprocates core means 31.

A second core means 39 reciprocates in boss 41 and forms the upright passageway of a T fitting. The boss 41 has a bore 42 in which the core 39 reciprocates and the face 41a of boss 41 forms a portion of the mold cavity.

The core member 39 has its end 43 confronting core member 31 contoured to fit core 31. As the two core members reciprocate in a common plane, the end of core 39 will engage core 31 to provide the intersection between the upright and cross passageways of the T fitting. Core 39 is reciprocated in a suitable guide 44 by a pneumatic motor indicated generally at 45. This motor is identical with the one previously described.

Ram 22 is reciprocated in the way by a suitable power means such as the pneumatic motor indicated generally at 46.

The ram is provided with adjustable stop means best shown in FIGURE 4. The stop means includes a pair of rods 47 and 48 having enlargements 47a and 48a, respectively, which strike the rear plate 49 of the way when the ram is fully extended.

Suitable dowels 51 and 52 are carried by the lower mold half and extend into holes such as 53 in the upper mold half (FIGURE 6).

The fittings are normally very difficult to remove from the molds, and therefore means have been provided for ejecting the fitting from the mold cavity. As the upper mold half provides less than half of the mold cavity, the fitting will remain in the bottom of the mold half when the two mold halves are parted. Means are provided in the bottom mold half for kicking the fitting upwardly out of the lower mold cavity. Such means is provided by a plurality of ejector pins such as shown at 54 and 55. In the T fitting it is preferred to have three ejector pins as indicated in dashed lines in FIGURE 4. The top surface of these pins form a portion of the mold cavity. These pins rest upon ejector bars 56 and 57. As shown in FIGURES 2 and 4, the two bars are joined by a cross bar 58 at one end. With this arrangement, raising of the bars 56 and 57 results in raising of the ejector pins 54 and 55 to lift the T fitting in the cavity so that it may be readily removed by hand.

The ejector bars 56 and 57 may be raised in any desired manner. Preferably, chains 59 through 62 are attached to eye bolts on the bars and to the carrier 11 of the press. These chains are adjusted in length such that as the press carrier 11 reaches the top of its travel, the chains lift the ejector bars and pins to free the fitting.

In operation, a carefully weighed mass of moldable material, such as a resin, mixed with reinforcing material such as fiberglass, is placed on the way bed 23 in front of the ram 22. The core 31 is extended into boss 30 and then the core 39 is extended into engagement with core 31. The carrier 11 is then lowered until the upper mold half rests firmly upon the lower mold half. At this time the ram 22 is extended to force the dry mass of plastic and reinforcing material into the mold cavity about the cores 31 and 39. Preferably a very slight excess of material is used which will slowly leak past the very close clearances between the cores and bosses, and the ram and its surrounding surfaces. Several hundred pounds of pressure will be exerted on the ram until it reaches fully extended position as determined by the stop heads 47a and 48a. The ram will be held in fully extended position until the fitting is cured. Steam passing through conduits 16 through 18 will pass through holes 63 in the upper mold half and 64 in the lower mold half to supply heat to the resin. The curing time will depend upon the particular resin and catalyst employed. Many suitable resins are well known and used in this service, and those previously used in molding fittings in half segments are suitable for use in this invention. It is preferred that the fitting be maintained under several hundred pounds of pressure at least until the resin begins to cure so that a high density fitting of high strength will result.

After the fitting has been held at the desired temperature for the length of time necessary to cure the fitting, the cores 31 and 39 and ram 22 are withdrawn. Then the mold halves are broken apart by raising carrier 11. As pointed out hereinabove, the cavity surface of the upper mold half 15 is less than that of the lower mold half, and the upper mold half will break free of the fitting when the carrier is raised. As the carrier reaches the top of its travel, the ejector bars will be raised by chains 59 through 62 to lift the fitting in the cavity.

FIGURES 7 and 8 show this invention as applied to a curved fitting. In this instance, the lower mold half indicated generally at 65 includes the lower section 66 of the cavity for the fitting and the two bosses 67 and 68. A ram 69 is reciprocal in a way which includes bed 71. These figures illustrate the use of the invention in forming socket end fittings instead of the flange end fittings illustrated with the T fitting.

A single core 72 is mounted for swinging movement about pivot 73. The core 72 is formed on a constant radius about the center of pivot 73 so that it may swing from an out-of-the-way position through boss 68 and into boss 67. To provide close tolerances and prevent dragging of the core on boss 68, an enlarged section or shoulder 72a is provided on the core which engages the bore 68a through boss 68.

Core 72 is moved into molding position by swinging the core carrier 74 about pivot 73. Then the latch indicated generally at 75 is swung over the free end of carrier 74 and the core is held in position by latch member 76. Member 76 is spring-loaded to permit ready engagement of the core carrier 74. As the pressures will be substantially equal within the mold cavity with respect to the core, there will be little resulting pressure which would tend to eject the core from the cavity. The unbalance of forces resulting from the presence of shoulder 72a is readily contained by latch 75.

FIGURE 8 shows generally at 77 the top half of the mold. The top half 77 of this mold cooperates with the lower half 65 in the same manner as the upper and lower halves of the T mold heretofore explained. Ejector means such as shown with the T mold may also be used with the angle mold.

The ram 69 is reciprocated by a suitable pneumatic motor 76 which is identical to a motor as heretofore discussed.

Use of the angle mold is identical with that of the T mold in that it is mounted in a press in the same manner as the T mold. Dry resin and reinforcing material such as fiberglass are moved from bed 71 into the cavity by ram 69 and held therein under pressure while heat is applied to cure the fitting.

The foregoing disclosure and description of the invention is illustrative and explanatory thereof and various changes in the size, shape and materials, as well as in the details of the illustrated construction, may be made within the scope of the appended claims without departing from the spirit of the invention.

What we claim is:

1. A molding apparatus for molding plastic fittings comprising,
   a press having a fixed platform and a movable carrier,
   a first mold half supported on the fixed platform,
   a second mold half supported on the carrier, said two mold halves having confronting cavities therein,
   a way on the first mold half communicating with the cavity on the first mold half,
   a ram reciprocal on said way for forcing dry molding material into said cavities and holding it under pressure,
   a surface on said second mold half cooperative with said ram for confining material on said way,
   said first and second mold half cavities forming with said ram the external configuration of a pipe fitting,
   core means extensible through and retractable from said cavities and forming a passageway through a fitting therein, means for reciprocating said ram, said ram forming an external solid surface of said configuration between the extremities of said passageway, and means for applying heat to said mold for curing a fitting therein.

2. A molding apparatus for molding plastic T fittings comprising, a press having a fixed platform and a movable carrier,
a first mold half supported on the fixed platform,
a second mold half supported on the carrier, said two mold halves having confronting cavities therein,
a way on the first mold half communicating with the cavity on the first mold half,
a ram reciprocal on said way for forcing dry molding material into said cavities and holding it under pressure,
a surface on said second mold half cooperative with said ram for confining material on said way,
said first and second mold half cavities forming with said ram the external configuration of a pipe T fitting, said ram forming an external solid surface of said configuration between the ends of the cross of the T and remote from the upright of the T,
a first core member extensible through said cavities to form the cross passageway through a T fitting,
a second core member extensible into said cavities and into abutment with said first core member to form the upright passageway through a T fitting,
means for reciprocating said cores and said ram,
and means for applying heat to said molds for curing a plastic T fitting therein.

3. A molding apparatus for molding plastic curved fittings comprising, a press having a fixed platform and a movable carrier,
a first mold half supported on the fixed platform,
a second mold half supported on the carrier, said two mold halves having confronting cavities therein,
a way on the first mold half communicating with the cavity on the first mold half,
a ram reciprocal on said way for forcing dry molding material into said cavities and holding it under pressure,
a surface on said second mold half cooperative with said ram for confining material on said way,
said first and second mold half cavities forming with said ram the external configuration of an angle fitting,
a core curved on a constant radius,
means mounting said core for swinging movement on said constant radius into and out of said cavities to form a curved passageway through a fitting, said ram forming an external configuration of an angle fitting between the extremities of said curved passageway,
means for reciprocating said ram,
and means for applying heat to said molds for curing a plastic fitting therein.

4. A molding apparatus for molding plastic curved fittings comprising, a press having a fixed platform and a movable carrier,
a first mold half supported on the fixed platform,
a second mold half supported on the carrier, said two mold halves having confronting cavities therein,
a way on the first mold half communicating with the cavity on the first mold half,
a ram reciprocal on said way for forcing dry molding material into said cavities and holding it under pressure,
a surface on said second mold half cooperative with said ram for confining material on said way,
said first and second mold half cavities forming with said ram the external configuration of an angle fitting,
a core curved on a constant radius,
means mounting said core for swinging movement on said constant radius into and out of said cavities to form a curved passageway through a fitting, said ram forming an external configuration of an angle fitting between the extremities of said curved passageway,
means for reciprocating said ram,
means for latching said core in said cavity,
and means for applying heat to said molds for curing a plastic fitting therein.

5. A molding apparatus for molding plastic fittings comprising, a press having a fixed platform and a movable carrier,
a first mold half supported on the fixed platform,
a second mold half supported on the carrier, said two mold halves having confronting cavities therein,
a way on the first mold half communicating with the cavity on the first mold half,
a ram reciprocal on said way for forcing dry molding material into said cavities and holding it under pressure,
a surface on said second mold half cooperative with said ram for confining material on said way,
said first and second mold half cavities forming with said ram the external configuration of a pipe fitting,
core means extensible through and retractable from said cavities and forming a passageway through a fitting therein, said ram forming an external configuration of an angle fitting between the extremities of said passageway,
means for reciprocating said ram,
means for applying heat to said mold for curing a fitting therein,
and means in at least one of said mold halves for ejecting a fitting.

6. A molding apparatus for molding plastic T fittings comprising, a press having a fixed platform and a movable carrier,
a first mold half supported on the fixed platform,
a second mold half supported on the carrier, said two mold halves having confronting cavities therein,
a way on the first mold half communicating with the cavity on the first mold half,
a ram reciprocal on said way for forcing dry molding material into said cavities and holding it under pressure,
a surface on said second mold half cooperative with said ram for confining material on said way,
said first and second mold half cavities forming with said ram the external configuration of a pipe T fitting,
a first core member extensible through said cavities to form the cross passageway through a T fitting, said ram forming an external solid surface of said configuration between the ends of the cross of the T and remote from the upright of the T,
a second core member extensible into said cavities and into abutment with said first core member to form the upright passageway through a T fitting,
means for reciprocating said cores and said ram,
means for applying heat to said molds for curing a plastic T fitting therein,
and means in at least one of said mold halves for ejecting a fitting.

7. A molding apparatus for molding plastic curved fittings comprising, a press having a fixed platform and a movable carrier,
a first mold half supported on the fixed platform,
a second mold half supported on the carrier, said two mold halves having confronting cavities therein,
a way on the first mold half communicating with the cavity on the first mold half,
a ram reciprocal on said way for forcing dry molding material into said cavities and holding it under pressure, a surface on said second mold half cooperative with said ram for confining material on said way, said first and second mold half cavities forming with said ram the external configuration of an angle fitting, a core curved on a constant radius, means mounting said core for swinging movement on said constant radius into and out of said cavities to form a curved passageway through a fitting, said ram forming an external configuration of an angle fitting between the extremities of said curved passageway, means for reciprocating said ram, means for applying heat to said molds for curing a plastic fitting therein, and means in at least one of said mold halves for ejecting a fitting.

8. A molding apparatus for molding plastic curved fittings comprising, a press having a fixed platform and a movable carrier, a first mold half supported on the fixed platform, a second mold half supported on the carrier, said two mold halves having confronting cavities therein, a way on the first mold half communicating with the cavity on the first mold half, a ram reciprocal on said way for forcing dry molding material into said cavities and holding it under pressure, a surface on said second mold half cooperative with said ram for confining material on said way, said first and second mold half cavities forming with said ram the external configuration of an angle fitting, a core curved on a constant radius, means mounting said core for swinging movement on said constant radius into and out of said cavities to form a curved passageway through a fitting, said ram forming an external configuration of an angle fitting between the extremities of said curved passageway, means for reciprocating said ram, means for latching said core in said cavity, means for applying heat to said molds for curing a plastic fitting therein, and means in at least one of said mold halves for ejecting a fitting.

References Cited by the Examiner

UNITED STATES PATENTS

| 2,079,393 | 5/1937 | Benge | 18—45 |
| 2,436,065 | 2/1948 | Dewey | 18—42 |
| 2,474,963 | 7/1949 | Wessel | 18—42 |
| 2,508,293 | 5/1950 | Powell | 25—39 |
| 2,688,159 | 9/1954 | Swartz | 18—42 |
| 2,751,237 | 6/1956 | Conley. | |
| 3,048,891 | 8/1962 | Maass | 18—45 X |

FOREIGN PATENTS

| 835,520 | 5/1960 | Great Britain. |
| 531,676 | 3/1955 | Italy. |
| 586,881 | 12/1958 | Italy. |

WILLIAM J. STEPHENSON, *Primary Examiner.*

MICHAEL V. BRINDISI, ROBERT F. WHITE,
*Examiners.*